United States Patent [19]
Stanek

[11] Patent Number: 6,136,055
[45] Date of Patent: Oct. 24, 2000

[54] SELF-CONTAINED PORTABLE/ MOUNTABLE AIR CLEANER

[75] Inventor: Terrence L. Stanek, St. Charles, Mo.

[73] Assignee: Emerson Electric Co., St. Louis, Mo.

[21] Appl. No.: 09/003,267

[22] Filed: Jan. 6, 1998

Related U.S. Application Data

[63] Continuation-in-part of application No. 08/683,711, Jul. 18, 1996, Pat. No. 5,741,341, which is a continuation-in-part of application No. 08/514,995, Aug. 14, 1995, abandoned.

[51] Int. Cl.$^7$ .................................................. B01D 46/00
[52] U.S. Cl. .............................. 55/357; 55/372; 55/378; 55/467; 55/482
[58] Field of Search ................................. 15/301; 55/356, 55/357, 358, 370, 372, 373, 377, 378, 379, 431, 467, 471, 472, 473, 482, 485, 493, 501, 508, 509, 511, DIG. 8, DIG. 18

[56] References Cited

U.S. PATENT DOCUMENTS

| | | | |
|---|---|---|---|
| 2,007,631 | 7/1935 | Bieth | 55/482 |
| 2,707,527 | 5/1955 | Brace | 55/357 |
| 2,776,726 | 1/1957 | Brace | 55/373 |
| 2,945,554 | 7/1960 | Berly | 55/358 |
| 3,066,345 | 12/1962 | Kasper | 55/372 |
| 3,166,393 | 1/1965 | Stevens | 55/DIG. 8 |
| 3,204,395 | 9/1965 | Howard | 55/482 |
| 3,286,446 | 11/1966 | Happe et al. | 55/472 |
| 3,930,818 | 1/1976 | McDougall | 55/467 |
| 5,018,238 | 5/1991 | Nelle | 15/301 |
| 5,443,625 | 8/1995 | Schaffhausen | 55/472 |
| 5,741,341 | 4/1998 | Stanek | 55/357 |

OTHER PUBLICATIONS

Sandor Nagyszalanczy, *Woodshop Dust Control*, 62–77 (Taunton Books & Videos) (1996).

*Primary Examiner*—C. Scott Bushey
*Attorney, Agent, or Firm*—Howrey Simon Arnold & White, LLP

[57] ABSTRACT

A portable, mountable air cleaner that is fashioned of a durable, molded plastic so as to be light weight; dimensioned to fit between typical 12 inch joists in a ceiling structure; containing a dual air filtration system; fashioned and configured so that each filter may be easily removed for cleaning; and that is capable of operation either resting on the ground or while suspended from a wall or ceiling structure.

17 Claims, 4 Drawing Sheets

SELF-CONTAINED PORTABLE/MOUNTABLE AIR CLEANER

CROSS REFERENCE TO RELATED APPLICATION

This is a continuation-in-part of copending patent application Ser. No. 08/683,711, filed on Jul. 18, 1996, now U.S. Pat. No. 5,741,341, which is a continuation-in-part of Ser. No. 08/514,995, filed Aug. 14, 1995, now abandoned, entitled SELF-CONTAINED PORTABLE/MOUNTABLE AIR CLEANER.

BACKGROUND OF THE INVENTION

The present invention relates to a portable/mountable air cleaner, and more specifically, to an air cleaner which includes a carrying handle extending from an air cleaner elongated body, dimensioned and configured to be mountable between 16 inch joists of a ceiling structure (measured from center to center of the joists), a dual air filter system where a fine air filter is mounted within the elongated body, and a pull-chain switching mechanism mounted in a recess of the handle for actuating the air cleaner.

Because home and industrial workshops generate a substantial quantity of saw dust and other fine particulate matters which are readily dispersed in the air, fine dust air cleaners have been developed. They are generally of two types: a floor mounted/console unit or a ceiling/wall mounted device. Typical examples of floor mounted/console units are shown in U.S. Pat. Nos. 3,802,168 and 4,894,071 which utilize rollers or wheels to move the fine dust air cleaner to a desired location. An example of a ceiling or wall mounted air cleaner device is shown in U.S. Pat. No. 3,930,818 where a more permanent type of mounting system is used.

Air cleaners with forced air filters and associated blowers are generally preferable over electrostatic type air cleaners because of lower cost, easier installation and maintenance, and higher capacity. On the other hand, air cleaners utilizing forced air filters and associated blowers have been unable to process large amounts of highly contaminated air and have also been difficult to service for cleaning and/or replacement of filters. As also indicated above, prior art air cleaners have either been of the portable or mountable type, but typically have not been both. Some users have preferred to move an air cleaner unit to a desired location, while others prefer to mount the air cleaner in a more permanent location. As disclosed in the aforementioned copending patent application, it is possible to provide a self-contained portable/mountable air cleaner which can provide both the portable and mountable desired functions. Moreover, constructing the air filter principally of a durable molded plastic allows for a light-weight air cleaner that can be easily moved or lifted for mounting overhead in compliance with weight limit standards for such activities.

According to the present invention, the portable/mountable air cleaner discloses an optional mounting strap system which facilitates installation when mounting to a ceiling and is dimensioned to fit between typical 16 inch joists in common ceiling structures. As this 16 inch measurement is made from center to center and the standard joist width is 3 inches, the unit must be less than 13 inches in maximum width to fit between such joists. Being able to mount the unit between such joists is beneficial as it allows for a greater head clearance, better space utilization, and reduces the chances of head injuries caused by running into the unit. Furthermore, the present invention discloses an improved integrally molded elongated body designed to contain a dual filter system including a coarse air filter and a fine air filter which can be easily accessed and removed for cleaning. Moreover, the present invention discloses a recessed handle which contains additional means for activating the air cleaner appropriate for ceiling suspension.

SUMMARY OF THE INVENTION

Among the several objects and advantages of the present invention include:

The provision of a new and improved portable/mountable air cleaner;

The provision of the aforementioned air cleaner which includes a carrying handle for transporting the air cleaner to a desired location or for mounting the air cleaner to a ceiling, wall or other structure, as may be desired;

The provision of the aforementioned air cleaner which can be mounted between the typical 16 inch joists of a ceiling structure;

The provision of the aforementioned air cleaner which includes an integrally molded elongated body designed to contain a dual air filter system including a coarse air filter and a fine air filter;

The provision of the aforementioned air cleaner in which the design of the air filters, their positioning within the elongated body, and the structure of their support within the elongated body are all fashioned so that both filters may be easily removed and cleaned;

The provision of the aforementioned invention with a pull chain for activating the unit and an activation light, both designed to aid in operating the unit when it is suspended from the ceiling.

Briefly stated, the portable/mountable air cleaner of the present invention includes an elongated body containing an air cleaner with a power driven air moving assembly. A supporting base extends from the elongated body for resting on a supporting surface. A carrying handle extends from the elongated body generally opposite the supporting base to facilitate carrying the air cleaner. Spaced suspension straps are associated with the elongated body for mounting the elongated body to a ceiling or wall structure.

The spaced suspension straps are preferably detachably associated with the elongated body. The spaced suspension straps also preferably extend transversely to the elongated body and extend through spaced slots formed in the elongated body. Preferably, the spaced slots are formed in the carrying handle on each side of an opening in the carrying handle that is large enough to facilitate grasping by a user. Fasteners such as hook fasteners or the like may be attached to each of outer ends of the spaced suspension straps for engaging complementary fasteners mounted to the ceiling or wall structure.

Preferably, the elongated body is configured, arranged, and dimensioned to fit between the typical 16 inch joists in a ceiling structure (measured from center to center of the joists). The body of the air cleaner is also preferably constructed of a durable, light-weight plastic which can be easily transported and lifted for mounting overhead.

A switch for energizing the air cleaner is mounted in a recessed area of the carrying handle. The switch preferably includes a pull cord and toggle combination for activating or deactivating the switch. The pull cord allows for activation while the unit is suspended and the toggle allows for activation while the unit is resting on a supporting surface. An activation light is also mounted in a recessed area of the carrying handle so that someone on the ground can readily ascertain whether the supported unit is activated.

The elongated body also preferably further includes a dual filtration system including coarse and fine air filters and an integrally molded elongated body designed to hold both filters. The filters and the elongated body are both fashioned so that the filters may be easily accessed for cleaning.

These and other objects and advantages of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENTS

Figure 1:
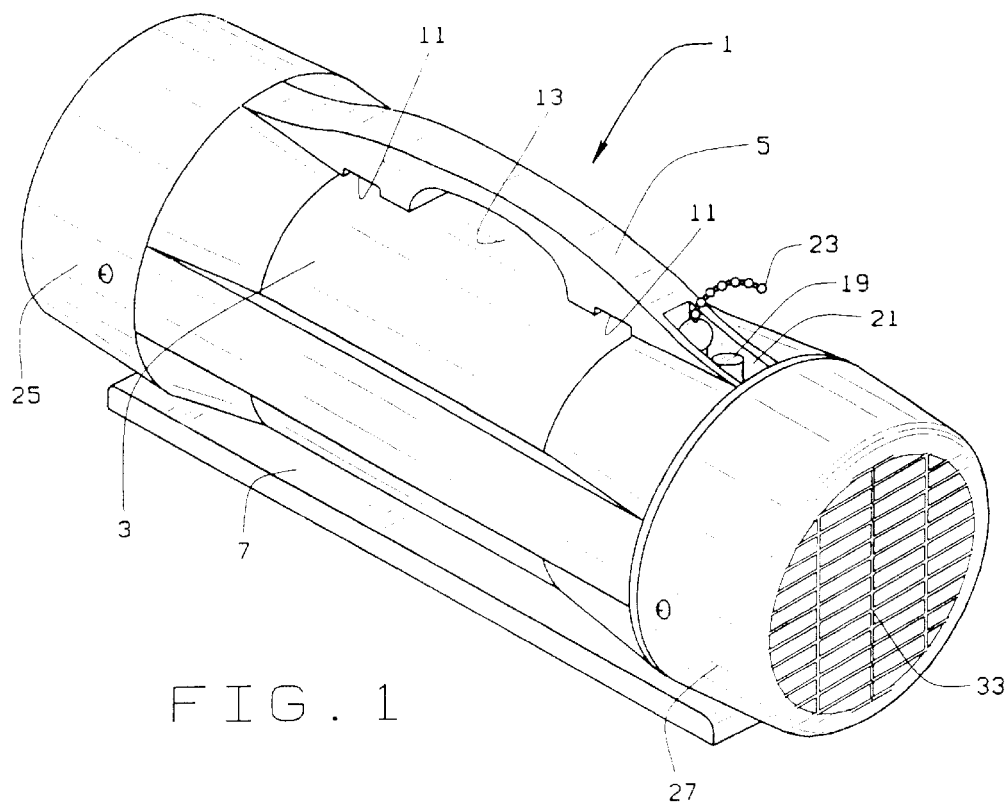
FIG. 1 is a perspective view of a portable/mounting fine dust air cleaner of the present invention.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

The portable/mountable air cleaner 1 illustrated in the drawings includes a hollow tubular and generally cylindrically shaped elongated body 3 preferably formed from a strong and durable plastic material by suitable molding techniques. The elongated body includes an upstanding integral carrying handle 5 for lifting and transporting the air cleaner 1 to any desired location. Generally opposite the upstanding integral carrying handle 5 is a supporting base 7 for resting the air cleaner 1 on a supporting surface. In this regard, it will be noted that the supporting base 7 extends laterally outwardly beyond the elongated body 3 on opposite sides thereof in order to provide a stable and secure supporting structure for resting the air cleaner 1 on a supporting surface.

Figure 2A:
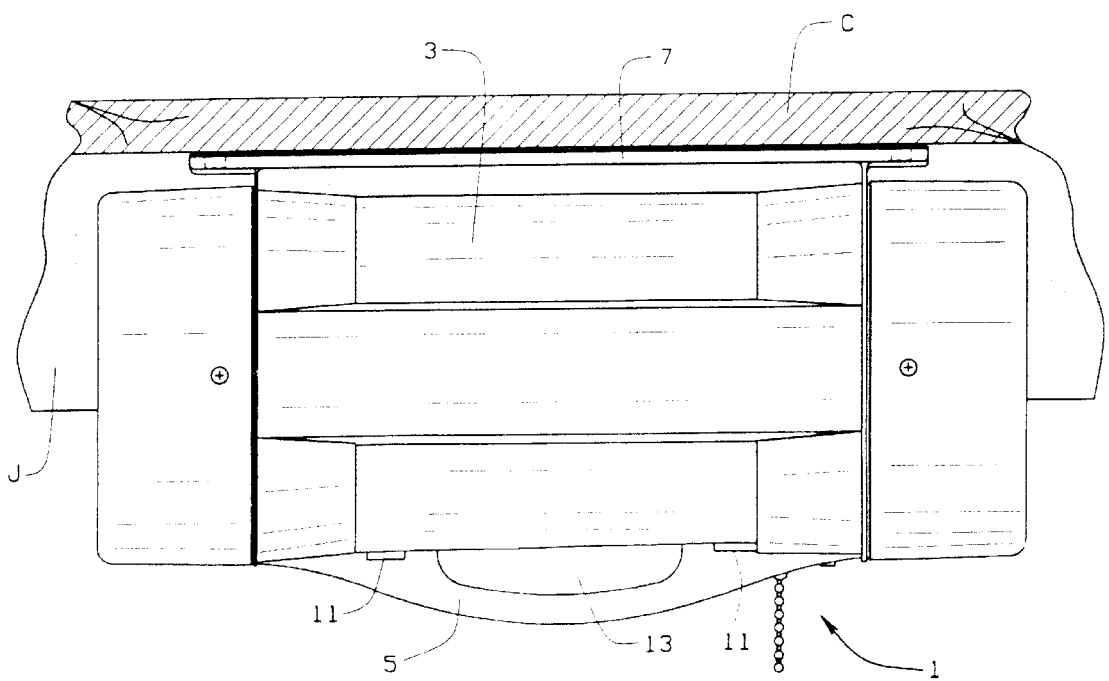
FIG. 2A is a side elevational view, partly in section, illustrating the air cleaner mounted between the joists in a ceiling structure.
Figure 2B:
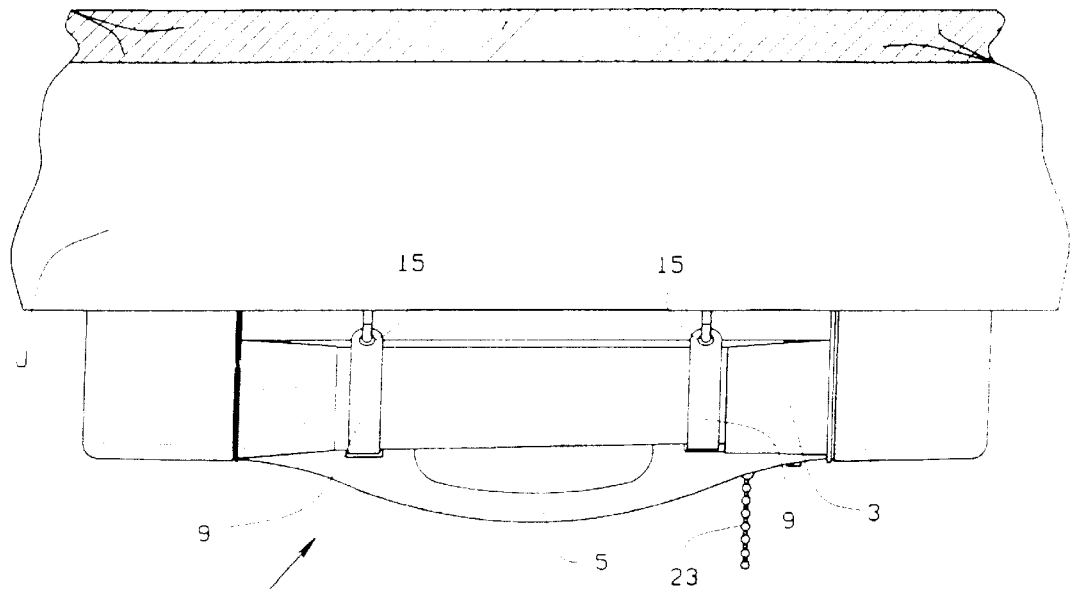
FIG. 2B is a side elevational view, partly in section, showing the air cleaner partially visible below the joists in a ceiling structure.
Figure 2C:
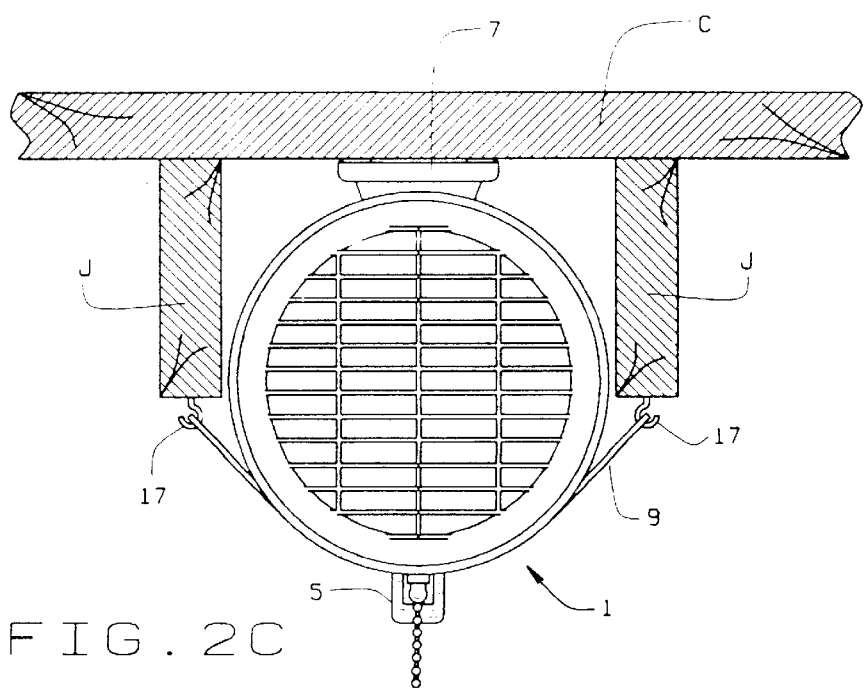
FIG. 2C is an end elevational view, partially in section, showing the air cleaner mounted between the joists in a ceiling structure.

The air cleaner 1 is also capable of being mounted between adjacent joists J of a ceiling structure C, as illustrated in FIGS. 2B–2C of the drawings. Alternatively, the air cleaner 1 may be mounted across the joists J or on a wall or other structure (not shown) as will be apparent. For mounting the air cleaner 1 between the adjacent joists J of a ceiling structure C, it will be seen that the elongated body 3 of the air cleaner 1 is dimensioned, configured and arranged with a maximum width of less than 13 inches to fit between the common 16 inch spaced joists J (measured from center to center) while the supporting base 7 rests against an interconnecting strut of the ceiling structure C, as best seen in FIG. 2C of the drawings. More specifically, in the preferred embodiment of this invention, the elongated body would be dimensioned generally cylindrically with a maximum diameter of about 11.5 inches.

The air cleaner 1 is constructed to include spaced, detachable suspension straps 9 which extend through spaced slots 11 on opposite sides of an opening 13 in the carrying handle 5. The opening 13 in carrying handle 5 is large enough to facilitate grasping by a user, while the spaced slots 11 detachably receive the spaced suspension straps 9. At the outer opposite ends of each of the spaced suspension straps 9, complementary openings 15 may be provided for engaging complementary hook fasteners 17 mounted at the lower end of the spaced joists J as shown in FIG. 2C of the drawings. Alternatively, the outer free ends of the spaced suspension straps 9 may themselves be provided with hook fasteners, as shown in FIG. 3 of the drawings, for engaging complementary fasteners (not shown) extending from the lower end of the spaced joists J.

Figure 3:
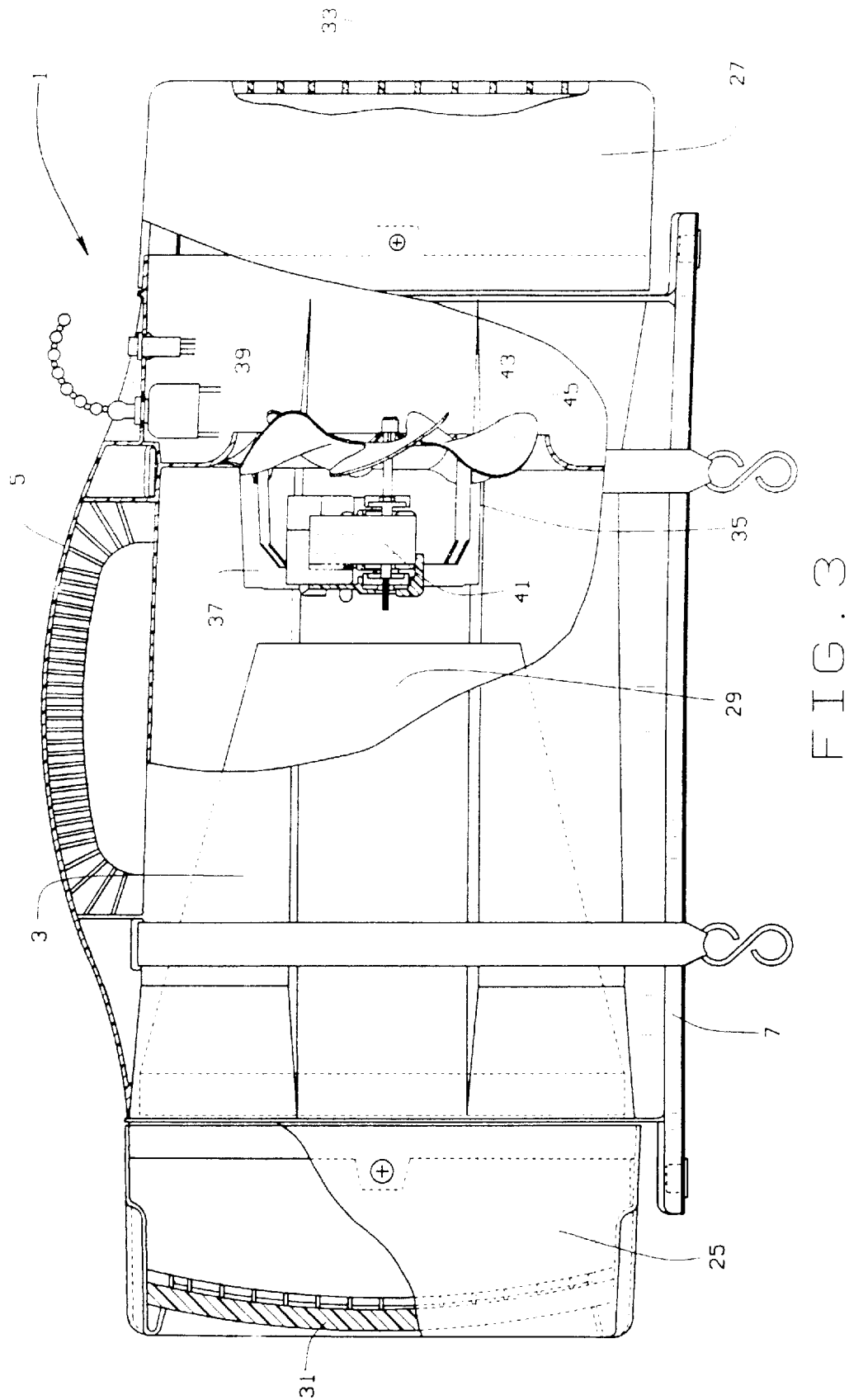
FIG. 3 is an enlarged side elevational view, partially in section, illustrating the air cleaner and its motor, motor frame, and venturi.

The air cleaner 1 of the present invention further includes an integrally molded motor frame and venturi 35, as best seen in FIG. 3 of the drawings. Specifically, the integrally molded motor frame and venturi 35 is supported by suitable fasteners or the like within the elongated body 3 in the position illustrated in FIG. 3. The integrally molded motor frame and venturi 35 includes a motor supporting section 37 and a venturi section 39. The motor supporting section 37 supports the motor 41 in a generally centralized position within the elongated body 3. The motor 41 drives an air moving assembly 43 which, in FIG. 3, is a power driven fan blade. The air moving assembly 43 can also be a blower wheel. The venturi section 39 is located in proximity to the motor driven air moving assembly 43 to facilitate the flow of air through the elongated body 3. In this regard, it will be noted that the venturi section 39 includes a restricted throat 45 surrounding the air moving assembly 43 to facilitate the flow of air through the elongated body 3.

In view of the above description, it will be appreciated that the air cleaner 1 can be used individually or in banks of air cleaners as portable units which are placed in proximity to an operation that creates contaminated air, or alternatively, the air cleaner 1 can be mounted between spaced joists J as shown in FIGS. 2A–2C of the drawings, in single or multiple units for maximum efficiency.

For energizing the air cleaner 1, a switch 23 is mounted in a recessed area 21 of the carrying handle 5. As shown in FIG. 2B of the drawings, the switch 23 is activated by both a toggle switch and a pull cord that hangs downwardly from the air cleaner 1 when mounted between spaced joists J as shown in FIG. 2B of the drawings. When resting on a supporting surface, the unit may be activated by the toggle switch. The pull cord of the switch 23 is utilized for activating or deactivating the switch 23 when the unit is suspended. Moreover, as shown in FIG. 1, the unit contains an activator light 19 which is illuminated when the unit is activated. This further assists people on the ground in determining when the unit is activated, particularly in areas where shop noise may make the sound of the unit inaudible. In its preferred embodiment, the walls of the recessed area in the handle extends above the height of the activator light and switch and protects them from damage during transportation of the unit or through normal shop activities.

To function as an air cleaner, the elongated body 3 as shown in FIG. 3, contains a generally flat coarse air filter 31, a bag-like fine air filter 29, and a power driven fan blade 43, all positioned so that the coarse air filter 31 is nearer to the air intake end of the elongated body 3 than the fine air filter 29, and where the fine air filter 29 is positioned nearer to the air intake end that the power driven fan blade 43. The air cleaner 1 includes an elongated body 3 with a defined air intake and exhaust end. It is fashioned to include a releasable/removable closure 25 at the intake end and a releasable/removable closure 27 at the exhaust end of the elongated body 3.

Figure 4:
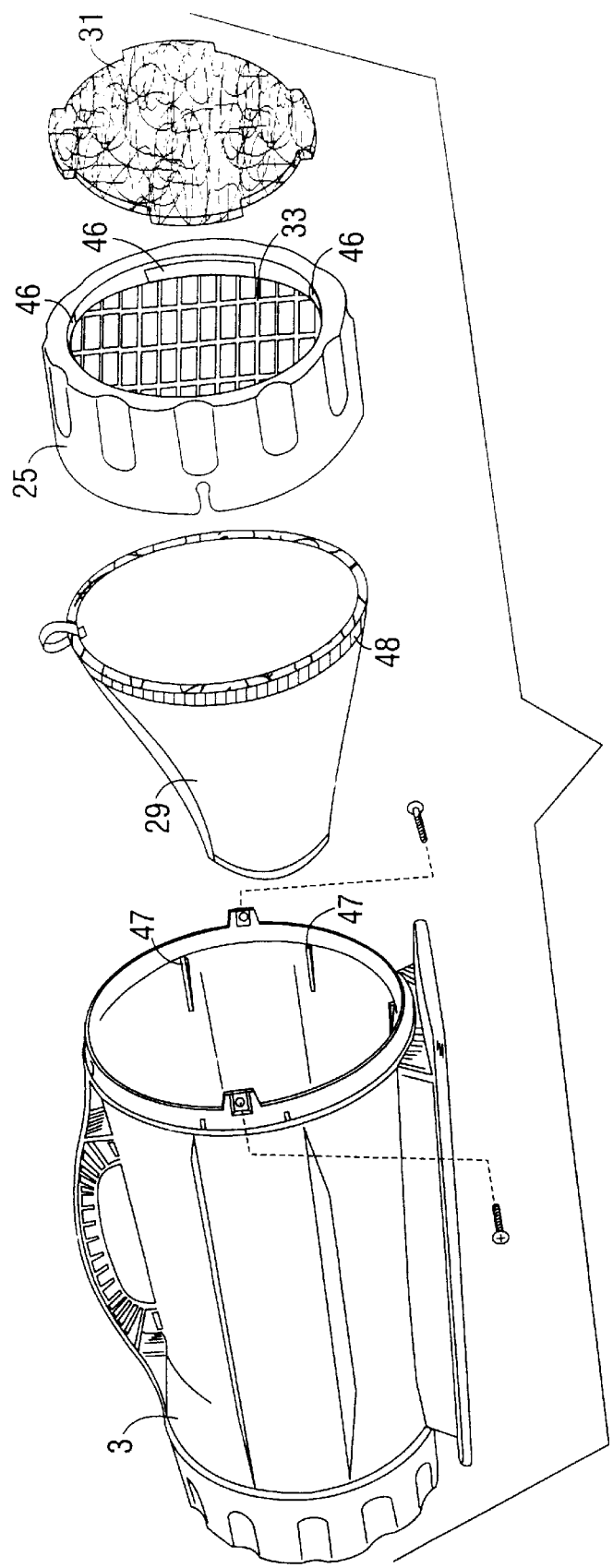
FIG. 4 is an enlarged partial side elevational view, partially in section, illustrating the air cleaner, and the coarse and fine air filters, and their supporting components.

The air cleaner 1 is designed with specific features to allow stable support of and easy access for cleaning to the coarse air filter 31 and the fine air filter 29. As shown in FIG. 4, the elongated body 3 is fashioned at the air intake end with recesses 46 to receive the coarse air filter 31 and a grating 33 to give support to the coarse air filter 31 on the exterior of the elongated body. The mounting of the coarse air filter 31 on the outside of the elongated body 3 is important as it is anticipated that the coarse air filter will need to be cleaned on a more regular basis than the fine air filter. One will note that the recesses 46 and the grate 33 which receive and give support to the coarse air filter 31 are fashioned so that the coarse air filter 31, made of a flexible, collapsible material, can be inserted into and removed from its position by compressing the filter. In its preferred embodiment, the air cleaner 1 includes a coarse air filter 31 made of a flexible, collapsible material which is flat and dimensioned in a fashion to fit within the receptors 46 over the supporting grate 33 defined on the air intake end of the elongated body. It is further preferred that the coarse air filter 31 be made of polyurethane open cell foam. As an alternative, the coarse air filter 31 may also be made of a non-woven polyester or electrostatic polypropylene.

With regard to the fine air filter 29, the elongated body 3 is molded with defined receptors 47 along its interior cavity to receive and hold the fine air filter 29. The fine air filter 29 is mounted on a flexible ring or support structure 48 that can be collapsed and will expand to hold itself in place on the interior of the elongated body 3 in conjunction with receptors 47 molded on the interior cavity of the elongated body 3. In its preferred embodiment, the fine air filter 29 is elongated, expands along a portion of the length of the elongated body 3, has an opening on the air intake end, and is either conically shaped, or partially conically shaped with a flat surface on the exhaust end which has a smaller surface area than the opening on the air intake end. As a further preferred embodiment, the fine air filter 29 is made of a flexible cloth-like material. In its further preferred embodiment, the fine air filter 29 is made of electrostatic carbon-activated polypropylene. As an alternative, the fine air filter may also be made of electrostatic polypropylene, non-woven polyester, or polyurethane open cell foam. Carbon-activated polypropylene is preferred as it also has an odor-reducing effect. One can note that the molded receptors 47 for the fine air filter 29 are fashioned so that the filter may be removed and inserted from the air intake end of the elongated body 3.

Finally, in its preferred embodiment, the air cleaner 1 is constructed of durable plastic which has been molded to define an elongated body 3, an interior cavity which contains an air moving assembly 43, a motor 41, a fine air filter 29, and a coarse air filter 31. The elongated body 3 is also molded to include support structures for the motor 37, fine air filter 47, and coarse air filter 33 and 46. This material and construction is used to result in a light-weight air cleaner which is portable and mountable. In its further preferred embodiment, the air cleaner 1 is of such a weight that an average person can easily lift it for mounting overhead. In its further preferred embodiment, the weight of the entire unit is less than 30 pounds to be in compliance with the ergonomic standard applicable to lifting and carrying objects that "Bulky articles should not weight more than about 30 lbs.;" or to otherwise be in compliance with the maximum load limits published by the National Institute of Safety and Health in the Work Practice Guide for Manual Lifting as stated in Woodson, et. al., *The Human Factors Design Handbook*, 2d Ed., p. 623 (McGraw-Hill 1992). In its further preferred embodiment, the weight of the entire unit is about 10.5 pounds.

From the foregoing, it will now be appreciated that the portable/mountable air cleaner 1 of the present invention enables the air cleaner 1 to be readily transported by the carrying handle 5 to a desired location for resting on a supporting surface or can be mounted through the spaced suspension straps 9 to a ceiling structure C, such as by locating the air cleaner 1 between 12 inch spaced joists J of the ceiling structure. The air cleaner 1 can be mounted to a ceiling structure in any desired manner or to a wall or other structure, if desired. The pull chain 23 and the activation light 19 both aid in utilizing the air cleaner 1 when it is suspended. Moreover, the receptors 46 and 47 are both fashioned to hold a dual filter filtration system including a coarse air filter 31 and a fine air filter 29. Filters 31 and 29, receptors 46 and 47, and the releasable/removable closures 25 and 27 are all fashioned so that the coarse air filter 31 and the fine air filter 29 can be easily removed for cleaning.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A portable mountable air cleaner comprising:
   an elongated, generally tubular body containing a power driven fan blade, where the elongated body has a defined air intake end and exhaust end and is fashioned to include a hollow interior cavity, and where both the air intake end and the exhaust end of the elongated body is covered with a removable grate structure;
   a generally flat coarse air filter positioned outside of the grate covering of the air intake end of the elongated body;
   a fine air filter contained at least partially within the interior cavity of the elongated body; and
   where the coarse air filter is positioned nearer to the air intake end of the elongated body than the fine air filter and where the fine air filter is positioned nearer to the air intake end than the power driven fan blade.

2. The portable mountable air filter as defined in claim 1 where the elongated body is fashioned both with a support base to provide stable support resting on a supporting surface and with a means for mounting the air cleaner on a ceiling.

3. The air cleaner as defined in claim 1 where the elongated body is fashioned at the air intake end with recesses defined to receive the coarse air filter and a grating defined to give support to the coarse air filter on the exterior of the elongated body.

4. The air cleaner as defined in claim 3 where the recesses and grate which receive and give support to the coarse air filter are fashioned so that the coarse air filter may be inserted into and removed from its intended position by compressing the filter.

5. The air cleaner as defined in claim 3 where the coarse air filter is made of a flexible, collapsible material which is flat and dimensioned and fashioned to fit within the recesses and over the supporting grate defined by the air intake end of the elongated body.

6. The air cleaner as defined in claim 3 where the material used to make the coarse air filter is polyurethane open cell foam.

7. The air cleaner as defined in claim 1 where the fine air filter is elongated, expands along a portion of the length of the elongated body, has an opening at the air intake end, and is at least partially conical shaped with a flat surface on the exhaust end which has a smaller surface area than the opening on the air intake end.

8. The air cleaner as defined in claim 1 where the fine air filter is made of a flexible material.

9. The air cleaner as defined in claim 1 where the fine air filter is made of a electrostatic carbon-activated polypropylene.

10. The air cleaner as defined in claim 1 where the elongated body is molded to define receptors along an interior cavity of the elongated body to receive and hold the fine air filter.

11. The air cleaner as defined in claim 10 where the fine air filter is mounted on a flexible support structure where the flexible support structure can be collapsed and will expand to hold the fine air filter in place within the interior cavity of the elongated body in conjunction with the receptors molded on the interior cavity of the elongated body.

12. The air cleaner as defined in claim 10 where the molded receptors for the fine air filter are fashioned so that the fine air filter may be removed and inserted from the air intake end of the elongated body.

13. The portable mountable air cleaner as defined in claim 1 where the weight of the entire unit is less than about 30 pounds.

14. The portable mountable air cleaner defined in claim 1 where the weight of the entire unit is about 10.5 pounds.

15. A portable mountable air cleaner assembly comprising:
- an elongated body containing an air cleaner including a power driven air moving assembly and a supporting base extending from the elongated body for resting on a supporting surface;
- a pair of joists which are spaced from each other and affixed to the supporting surface;
- means for mounting the elongated body to the pair of joists such that a portion of the elongated body is positioned between the pair of joists;
- a carrying handle extending from the elongated body generally opposite its supporting base; and
- a switch for energizing the air cleaner mounted in the carrying handle; where the switch for energizing the air cleaner may be activated by a pull chain.

16. The portable mountable air cleaner defined in claim 15 where the switch is mounted in a recessed area in the carrying handle and where the recessed area of the carrying handle also contains a three dimensional light which indicates when the air cleaner is activated.

17. The portable mountable air cleaner as defined in claim 16 where the recessed area in the carrying handle is fashioned so that its walls extend beyond the height of the activator light and switch.

* * * * *